Figure 1:
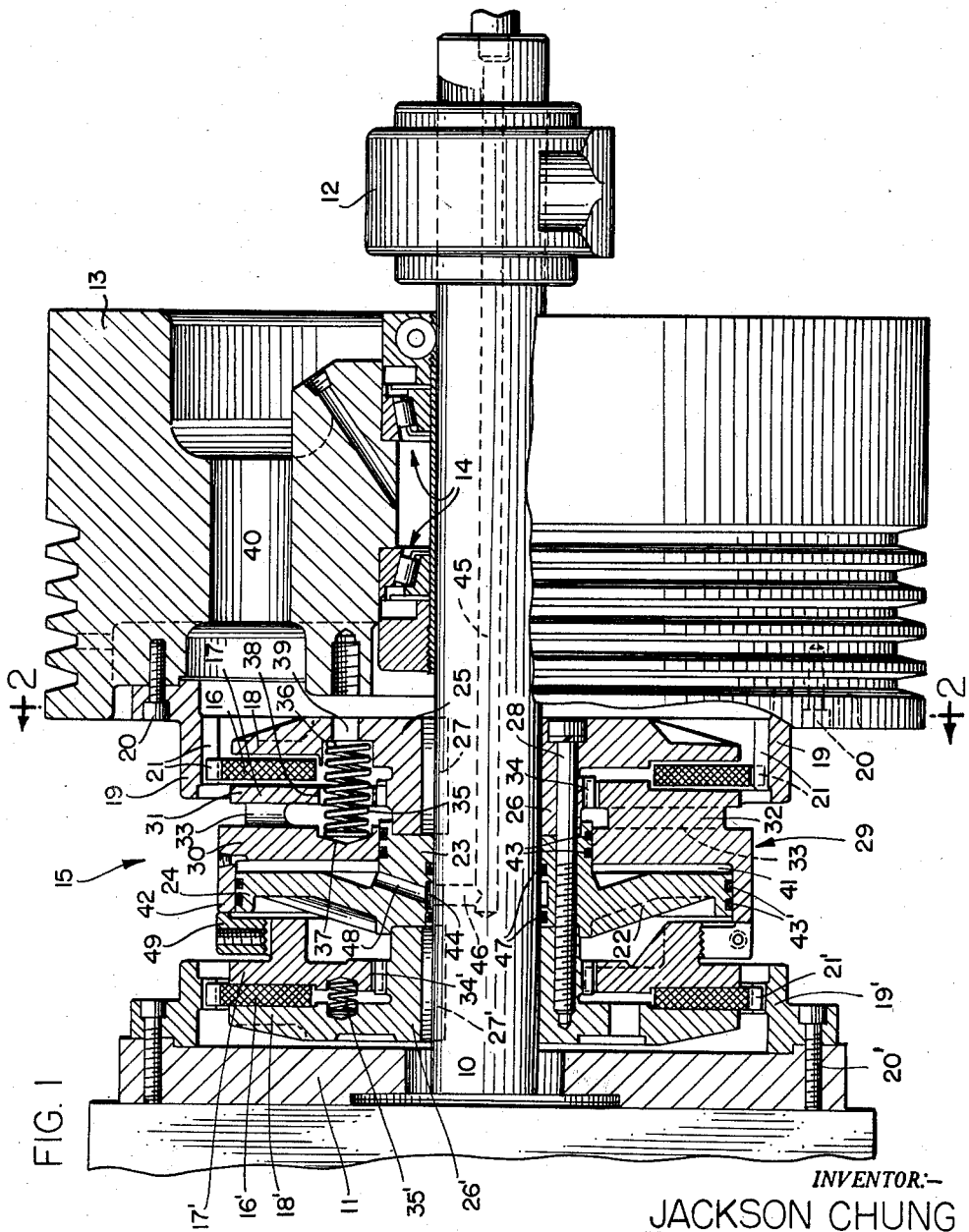

Oct. 20, 1959   JACKSON CHUNG   2,909,255
DYNAMIC MECHANISM

Filed Aug. 30, 1955   2 Sheets-Sheet 1

FIG. I

INVENTOR:—
JACKSON CHUNG
BY:—
Marzall, Johnston, Cook & Root
ATT'YS

2,909,255
DYNAMIC MECHANISM

Jackson Chung, Mishawaka, Ind., assignor to Dodge Manufacturing Corporation, Mishawaka, Ind., a corporation of Indiana Application August 30, 1955, Serial No. 531,548

4 Claims. (Cl. 192—18)

The present invention relates in general to dynamic mechanism of the sort adapted for application to the control of shaft transmitted mechanical power, as by means of mechanism operatively associated with the the shaft and forming a power brake or like mechanism constituting a power transmission clutch.

An important object of the present invention is to provide dynamic mechanism of the character mentioned and embodying both a shaft associated clutch and a brake; a further object being to provide a combined clutch and brake structure for pressure fluid operation; a still further object being to provide a combined clutch and brake structure, including means for alternately actuating the clutch and brake components.

Another important object is to provide dynamic mechanism including a rotatable shaft member, a cooperating wheel member mounted for turning movement relative to the shaft member, a clutch normally held in released position, actuating means for engaging the clutch to drivingly connect the wheel and shaft members, and brake means normally biased toward released or inactive condition and operable to brake rotation of one of said members only when the clutch structure is in its released position; a further object being to employ a movable component of the clutch structure to actuate the brake as said component is shifted to clutch released position.

Another important object is to provide a dynamic structure of the character mentioned embodying a minimum number of parts of relatively simple configuration, to thereby afford simplicity and economy of construction, and to facilitate assembly of the device as well as the replacement of parts therein.

The foregoing and numerous other important objects, advantages, and inherent functions of the invention will become apparent as the same is more fully understood from the following description, which, taken in connection with the accompanying drawings, discloses a preferred embodiment of the invention.

Figure 2:
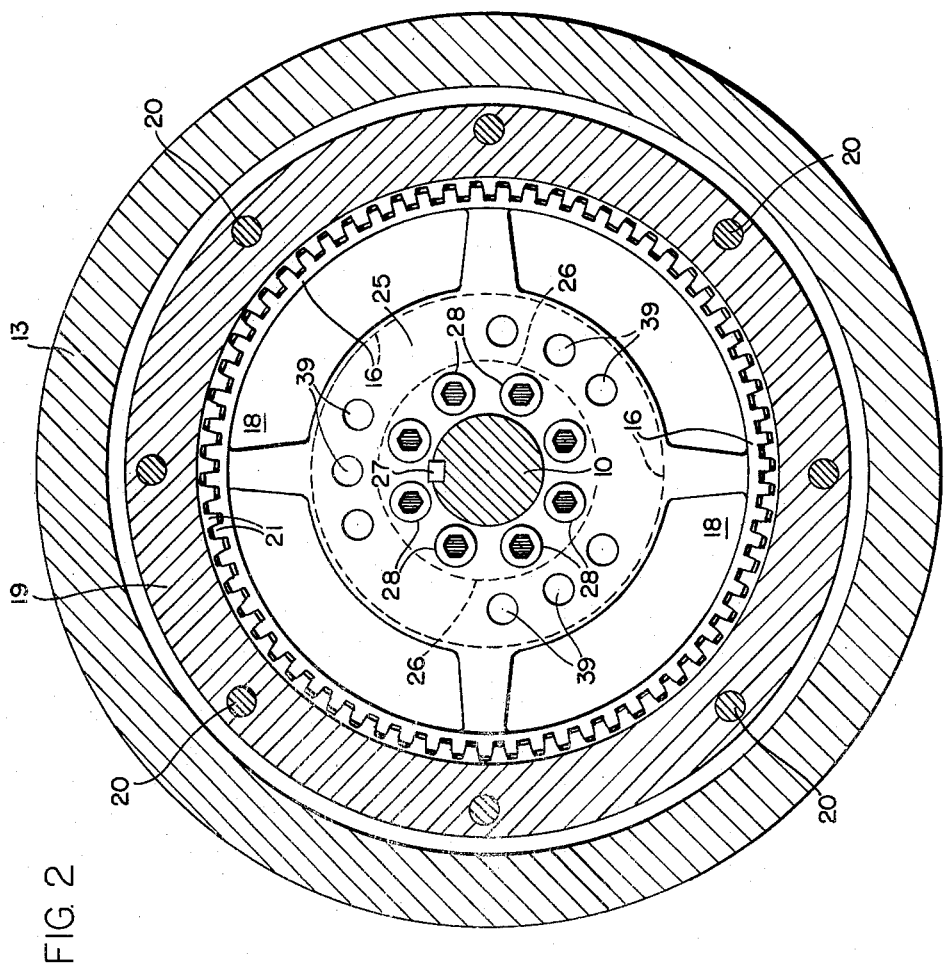

Referring to the drawings:

Fig. 1 is a sectional view taken longitudinally through dynamic mechanism embodying the present invention; and Fig. 2 is a sectional view taken substantially along the line 2—2 in Fig. 1.

To illustrate the invention the drawings show a dynamic structure comprising a shaft member 10 turnably mounted in spaced bearings, including a bearing formed in a support frame 11 and a pedestal bearing 12 spaced from said frame, a pulley or flywheel member 13 mounted, as by means of suitable bearings 14, for relative turning movement with respect to the shaft member 10, and a combined clutch and brake structure for drivingly interconnecting the shaft and flywheel members, and alternately for braking turning movement of one of the members with respect to the stationary frame 11.

As shown, the wheel 13 comprises a combined driving pulley and flywheel having circumferential belt receiving grooves formed therein, whereby the same may be drivingly connected with a motor, as by means of groove carried belts. The brake forming components of the combined brake and clutch structure 15, moreover, are applied to brake the turning movement of the shaft 10 with respect to the frame 11. As shown, the structure 15 may comprise a clutch plate 16 of ring-like configuration drivingly connected with the wheel 13, cooperating clutch plates 17 and 18 drivingly connected with the shaft 10, and means to press the plates 17 and 18 mutually together and into frictional clutching engagement with the plate 16, to thereby engage the clutch and drivingly connect the flywheel with the shaft, the plates 17 and 18 being mutually separable in order to release the clutch.

To these ends, the clutch structure may comprise a ring-like mounting frame 19 adapted to support the clutch plate 16 on the wheel 13, means such as bolts 20 being provided for fastening the mounting ring to the rim of the wheel 13. In order to prevent relative rotation of the clutch plate 16 within and with respect to the mounting ring 19, the peripheral edge of the plate and the inwardly facing surface of the ring may be formed with interfitting spline means 21, the same preferably comprising integral interfitting teeth formed on the clutch plate and the mounting ring whereby the plate is supported against relative turning movement with respect to the ring, plate movement with respect to the ring, axially of the shaft 10, being freely permitted.

The clutch structure may also comprise a wheel-like frame 22 embodying a central hub 23, sized to snugly fit the shaft 10, and a preferably circular rim 24, means being provided for securing the frame 22 to the shaft 10. As shown, the frame 22 may be secured to the shaft by means of a wheel-like member 25 forming the clutch plate 18 and having a central hub 26 sized to snugly fit the shaft 10, a spline or feather 27, or other suitable fastening means, being employed to secure the plate member 25 on the shaft. The hub 26 at one end may be formed to abut against the facing end of the hub 23, fastening studs 28 being employed to secure the hubs 23 and 26 firmly together in end abutting relationship.

The clutch structure may also comprise an annular member 29 cooperatively associated with the frame 22 and disposed between said frame and the plate member 25, means being provided for moving the member 29 with respect to the frame 22 in a direction axially of the shaft 10 toward and away from the plate member 25, in order to engage the clutch by pressing the wheel connected clutch plate 16 between the members 25 and 29. To this end, the member 29 may comprise a pair of annular plate portions 30 and 31 rigidly secured together in spaced relationship in any suitable or convenient fashion, the plate portion 31 constituting the clutch plate 17 and being supported in position facing the plate 18. The plate portions 30 and 31 are preferably integrally united, as by means of circularly spaced bosses 32 disposed between the plate portions, said spaced bosses defining radial air ducts 33 between the plate portions.

In order to prevent relative rotation of the member 29 with respect to the frame member 22 and the shaft connected plate 25, the inner edge of the plate portion 31 and the hub 26 which extends therein may be formed with interfitting spline means 34, the same preferably comprising integral interfitting teeth formed on the hub 26, adjacent the plate portion 25, and on the inner edge of the plate portion 31. The annular member 29 is thus anchored against relative turning movement with respect to the frame 22 and the plate member 25 while being free to move therebetween axially of the shaft 10, to thereby frictionally engage and release the clutch plate 16 between the plate portions 17 and 18.

Suitable means, such as the circularly spaced, preferably helical compression springs 35, may be provided for normally urging the member 29 in a direction axially of the shaft 10 and away from the plate member 25, to thereby release the plates 17 and 18 from clutching engagement with the plate 16. As shown, the springs 35 may be seated at one end in pockets 36 formed in the plate member 25 immediately outwardly of the hub 26 and inwardly of the inner edge of the plate 16. Each spring, at its opposite end, may engage in a seat 37 formed in the plate portion 30 of the member 29, the springs 35 extending freely each in an opening 38 formed in the plate portion 31 of the member 29. The plate member 25 may be formed with openings 39 therethrough, each of said openings communicating with a corresponding one of the spring seats 37 and thence through one of the openings 38 with a corresponding one of the radial ducts 33, whereby cooling air may be delivered to the ducts through the openings 39, said openings being connected with atmosphere by means of channels 40 formed through the wheel 13.

The frame 22 and the plate portion 30 of the member 29 form an expansible chamber 41 of ring-like configuration therebetween. As a consequence, by applying a suitable fluid pressure medium, such as air, in such expansible chamber, the member 29 may be moved with respect to the frame 22 in a direction axially of the shaft 10 in order to press the plate 17 toward the plate 18, and thereby squeeze the plate 16 frictionally therebetween to thus engage the clutch and drivingly connect the shaft and wheel members 10 and 13. To this end, the plate portion 30 may be formed with a peripheral rim 42 sized to snugly yet slidingly embrace the rim 24 of the frame 22. The inner circular edge of the plate portion 30 may be formed to snugly yet slidingly embrace an outwardly facing seat formed on the hub portion 23 of the frame 22. The hub 23 and rim 24 of the frame 22, if desired, may be formed with circumferential grooves, respectively containing rings of packing material 43 and 43', in order to seal the inner and outer sides of the expansible chamber 41.

In order to apply a clutch actuating medium under pressure in the chamber 41 to engage the clutch against the contrary urge of the springs 35, the hub 23 of the frame 22 may be provided with an internal annular groove 44, and the shaft 10 may be provided with an axial bore 45 communicating with the groove 44 through a radial duct 46 formed in the shaft. If desired, the hub 23 may also be provided with grooves spaced outwardly and on opposite sides of the groove 44 for the purpose of carrying sealing rings 47 of suitable packing material. A fluid pressure medium, such as air, thus may be delivered from an external source, as through suitable control valves, into the bore 45 and thence to the groove 44 through the duct 46. From the groove 44 the fluid pressure medium may be applied into the expansible chamber 41, as through radial channels 48 formed through the hub 23 from the groove 44 to the surface of the frame which defines one side of the chamber 41.

Accordingly, in order to cause engagement of the clutch plates 17 and 18 with the wheel connected plate 16, it is merely necessary to apply the fluid pressure medium in the chamber 41 at a pressure sufficient to overcome the contrary urge of the springs 35. In order to release the clutch, it is merely necessary to reduce the pressure of the fluid medium in the chamber 41, as by venting the chamber to atmosphere, whereupon the springs 35 may act to disengage the clutch. Any suitable control valve mechanism may be employed for delivering fluid under pressure to the chamber 41 through the channel 45 and for venting the chamber to atmosphere.

The present invention also contemplates the provision of means for braking the shaft member 10 as and when the clutch mechanism, including the annular member 29, is in clutch released position. To this end, the braking means may comprise a brake plate 16' of ring-like configuration, similar to the clutch plate 16, and drivingly connected with the stationary frame member 11, and co-operating brake plates 17' and 18', similar to the clutch plates 17 and 18, and like them drivingly connected with the shaft 10, movement of the member 29 in the clutch releasing direction, under the influence of the springs 35, being employed to press the brake plates 17' and 18' mutually together and into frictional braking engagement with the plate 16', to thereby apply the brake between the shaft and the stationary member 11, the plates 17' and 18' being mutually separable in order to release the brake.

To these ends, the brake structure may comprise a ring-like mounting frame 19', generally similar to the mounting frame 19 of the clutch structure and adapted to support the brake plate 16' on the member 11, means such as bolts 20' being provided for fastening the mounting ring 19' to the member 11. In order to prevent relative rotation of the brake plate 16' within and with respect to the mounting ring 19', the peripheral edge of the plate and the inwardly facing surface of the ring may be formed with interfitting spline means 21', the same preferably comprising integral interfitting teeth formed on the brake plate and the mounting ring, whereby the plate is supported against relative turning movement with respect to the ring, plate movement with respect to the ring, axially of the shaft 10, being freely permitted.

The brake plate member 18', like the clutch plate member 18, may be formed with a central hub 26' sized to snugly fit the shaft 10, a spline or feather 27', or other suitable fastening means, being employed to secure the hub 26' of the plate member on the shaft. The hub 26' at one end may be formed to abut against the facing end of the hub 23, and the fastening studs 28 may be employed to secure the hubs 23, 26 and 26' firmly together in end abutting relationship. In order to prevent relative rotation of the brake plate 17' with respect to the shaft, the inner edge thereof and the hub 26' which extends therein may be formed with interfitting spline means 34', the same preferably comprising integral interfitting teeth formed on the hub 26' adjacent the plate 18', and on the inner edge of the plate 17'. The ring-like brake plate 17' is thus anchored against relative turning movement with respect to the splined hub 26' and the plate 18', while being free to move axially of the shaft 10, to thereby frictionally engage and release the brake plate 16' between the brake plate portions 17' and 18'.

Suitable means, such as the circularly spaced, preferably helical compression springs 35', may be provided for normally urging the plate members 17' and 18' mutually apart, to thereby release the plates 17' and 18' from braking engagement with the plate 16'. As shown, the springs 35' may be seated at their opposite ends in seating pockets formed in oppositely registering position in the plate members 17' and 18' inwardly of the inner edge of the plate member 16' and outwardly of the hub 26'. The springs 35' should be substantially less powerful than the springs 35 whereby the member 29, in pressing upon the plate member 17' under the urge of the springs 35, when the clutch structure is in released condition, may overcome the contrary urge of the springs 35' and thereby press the brake plate 17' toward the plate 18' to frictionally engage the plate 16' therebetween and thus apply the brake by means of the thrust of the springs 35, the brake, of course, being permitted to assume released position under the influence of the springs 35' whenever the clutch structure is shifted from released position against the influence of the springs 35 by the delivery of actuating fluid under pressure in the expansible chamber 41. Any suitable or preferred thrust transfer means may be applied for delivering the thrust of the member 29 upon the brake plate 17'. As shown, the plate 17' may carry a thrust collar 49 fixed thereto in position to register with the peripheral rim 42 of the member 29 to apply the thrust of the member 29 upon the brake plate 17'.

It will be seen from the foregoing that, upon application of a fluid actuating medium under pressure through the bore 45 and into the chamber 41, the clutch mechanism will be moved to clutch engaged position against the contrary thrust of the springs 35, the brake mechanism being simultaneously shifted to released position under the influence of the springs 35'. Upon reduction of pressure of the actuating medium in the chamber 41, as by venting the chamber to outer atmosphere, the springs 35 may act immediately to shift the clutch structure to its released condition and simultaneously to apply the brake against the contrary thrust of the appreciably weaker springs 35'.

It is though that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Dynamic mechanism comprising the combination, with a shaft, a frame or base with respect to which the shaft is relatively rotatable, and a wheel turnably mounted on the shaft, of friction clutch means for drivingly connecting said shaft and wheel, friction brake means for brakingly connecting said shaft and frame, biasing means normally urging said brake means toward released position, thrust spring means normally urging said clutch means toward released position and for shifting said brake means toward operating position against the influence of said biasing means, and normally inactive pressure fluid actuating means operable to shift the clutch means toward engaged position against the influence of said spring means, whereby to drivingly connect the shaft for turning movement with the wheel and alternately to disconnect the shaft and wheel and brakingly connect the shaft with the frame, said brake, clutch and actuating means each comprising a pair of plate-like members secured on the shaft and a cooperating member movable axially toward and away from the plate-like member, said actuating means being mounted on the shaft between the mutually facing cooperating members of the brake and clutch means, the cooperating member of the actuating means being drivingly secured together with the cooperating member of the clutch means and having bearing engagement in one direction with the cooperating member of the brake means.

2. Dynamic mechanism comprising the combination, with a shaft, a frame or base with respect to which the shaft is relatively rotatable, and a wheel turnably mounted on the shaft, of friction clutch means for drivingly connecting said shaft and wheel, friction brake means for brakingly connecting said shaft and frame, biasing means normally urging said brake means toward released position, thrust spring means normally urging said clutch means toward released position and for shifting said brake means toward operating position against the influence of said biasing means, and normally inactive pressure fluid actuating means comprising a plate-like member mounted on said shaft against movement axially thereof, a ring-like member mounted for movement axially of the shaft in position to shift the clutch means toward engaged position, when moved in one direction on the shaft, against said spring means, and to shift the brake means toward engaged position, when moved on the shaft in the opposite direction, said ring-like member being cooperatively associated with said plate-like member to form an expansible pressure fluid chamber therebetween, and intercommunicating duct means in said shaft and plate-like member for delivering fluid under pressure into said chamber to move the ring-like member against the influence of said spring means.

3. Dynamic mechanism comprising the combination, with a shaft, a frame or base with respect to which the shaft is relatively rotatable, and a wheel turnably mounted on the shaft, of friction clutch means for drivingly connecting said shaft and wheel and comprising clutch disk means secured to said wheel and a pair of clutch plates disposed on opposite sides of said disk means in clutching and de-clutching relationship therewith, means drivingly connecting said plates with said shaft, friction brake means for brakingly connecting said shaft and frame, resilient biasing means normally urging said brake means toward released position, thrust spring means interposed between and normally urging said clutch plates apart toward released position with respect to said disk means, and normally inactive pressure fluid actuating means comprising a piston component secured on said shaft between said clutch and brake means and a cylinder component slidable on said piston in the axial direction of said shaft and forming an expansible fluid pressure chamber with said piston, said cylinder having a portion in position to drivingly engage and actuate said brake against the influence of said biasing means and a portion drivingly connected with one of said clutch plates to actuate the same toward clutch engaged position against the influence of said spring means.

4. Dynamic mechanism as set forth in claim 3 wherein said clutch plates and said cylinder component are formed with ducts providing for the circulation of cooling air in heat exchange relation with respect to the disk engaging portions of said clutch plates.

References Cited in the file of this patent

UNITED STATES PATENTS

| | | |
|---|---|---|
| 1,599,373 | Roberts | Sept. 7, 1926 |
| 2,023,597 | Klocke et al. | Dec. 10, 1935 |
| 2,095,816 | Johansen | Oct. 12, 1937 |
| 2,159,326 | Harwood et al. | May 23, 1939 |
| 2,441,543 | Longfield | May 11, 1948 |
| 2,472,452 | Wissman | June 7, 1949 |
| 2,674,356 | Eason | Apr. 6, 1954 |
| 2,785,781 | Johansen | Mar. 19, 1957 |